Aug. 21, 1923.
R. CRAIG
1,465,252
WEIGHING SCALE
Filed May 7, 1921
4 Sheets-Sheet 4
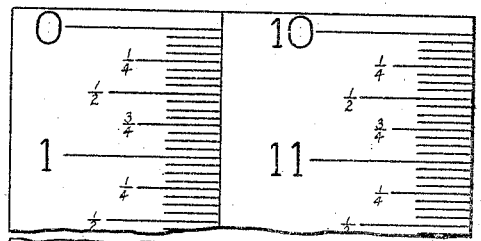
Fig. 8.
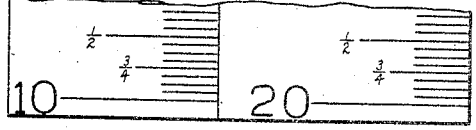
Fig. 9.
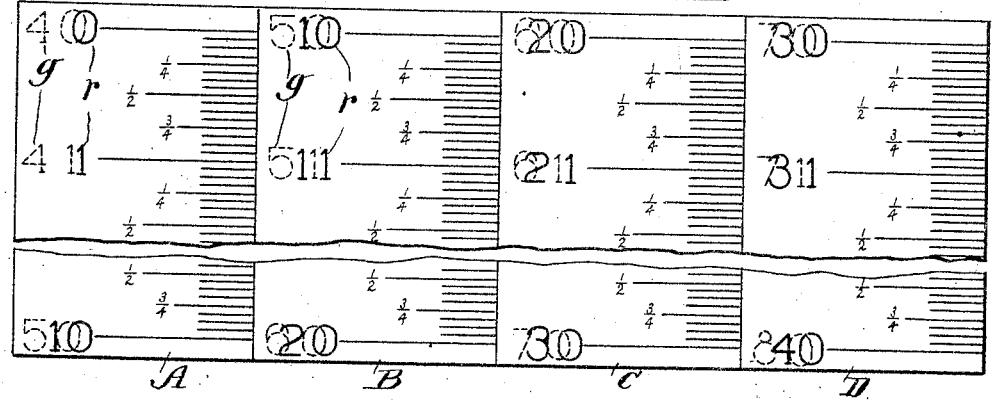
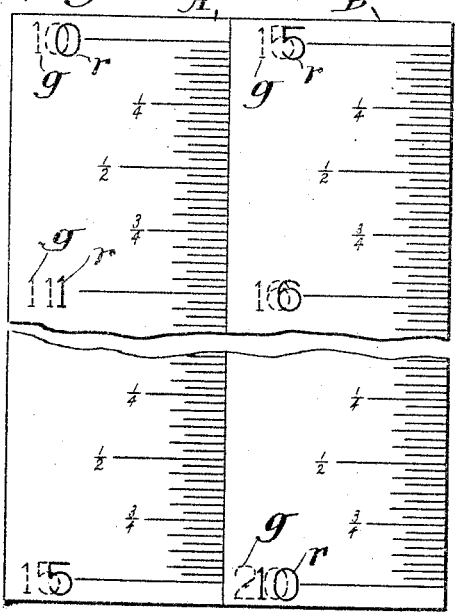
Fig. 10.
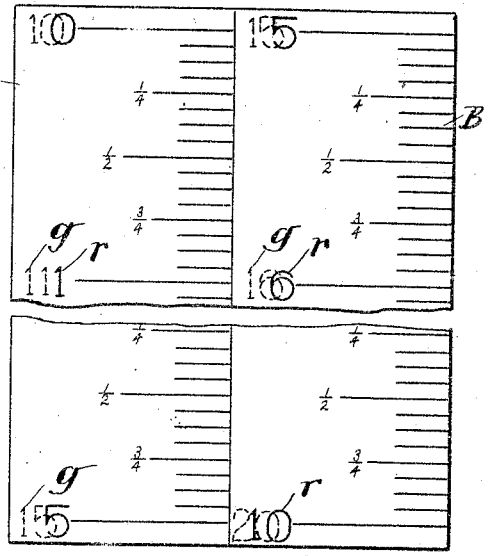
Fig. 11.
Inventor
Robert Craig.
By his Attorneys
Kerr Page Cooper & Hayward Patented Aug. 21, 1923.

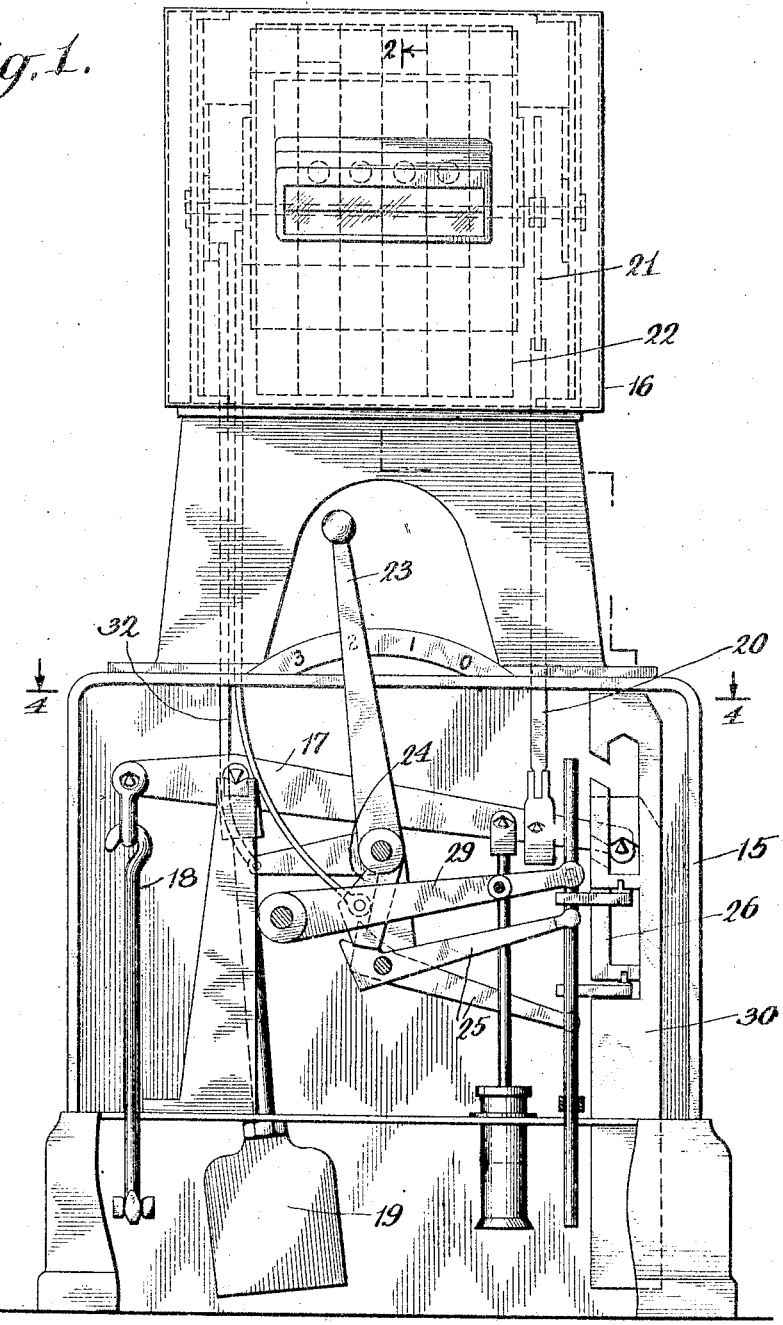

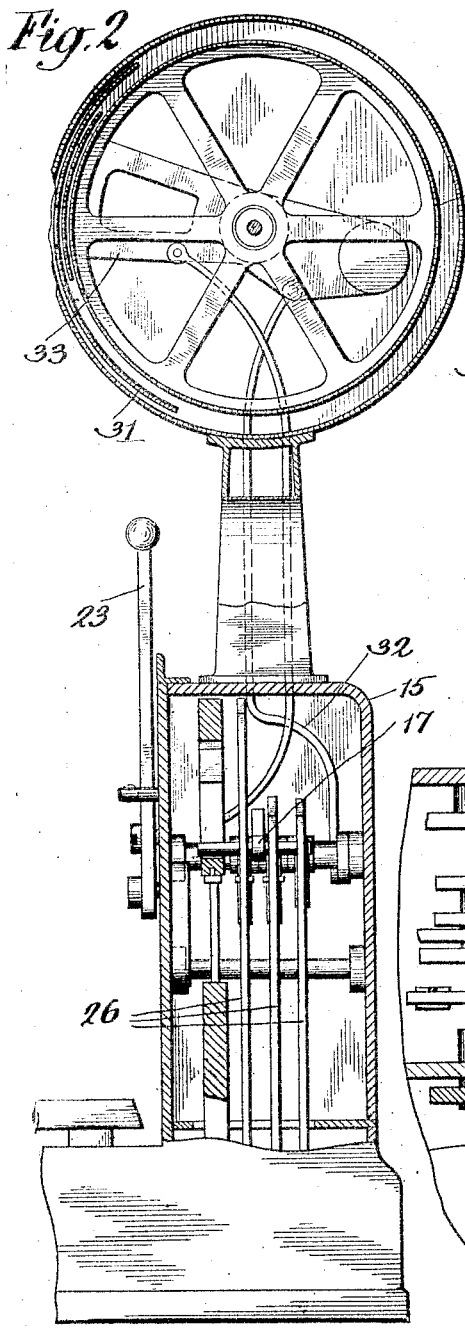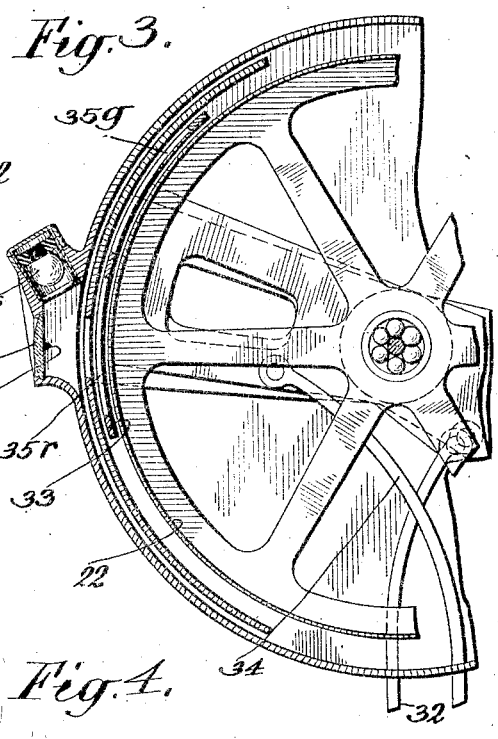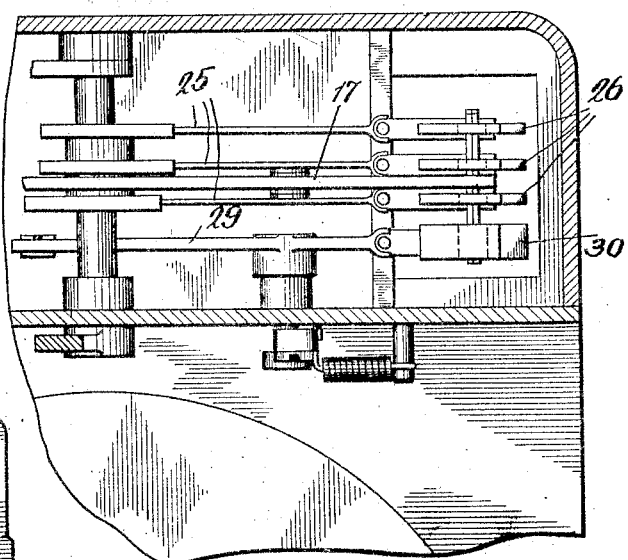

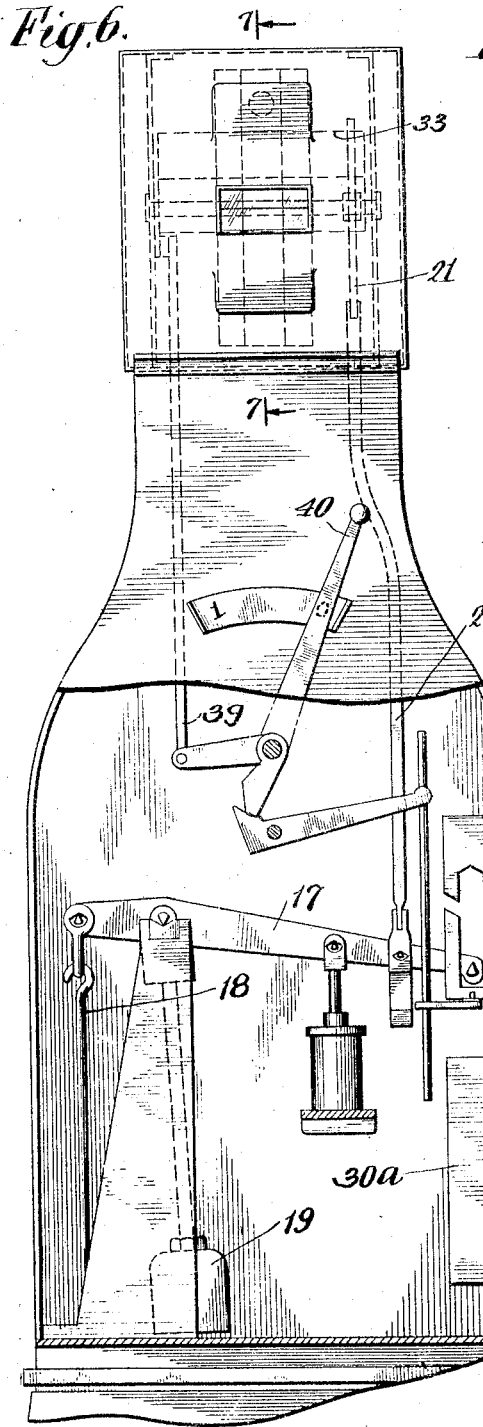
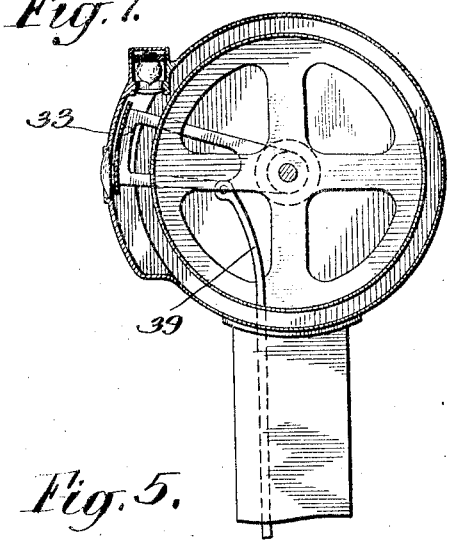
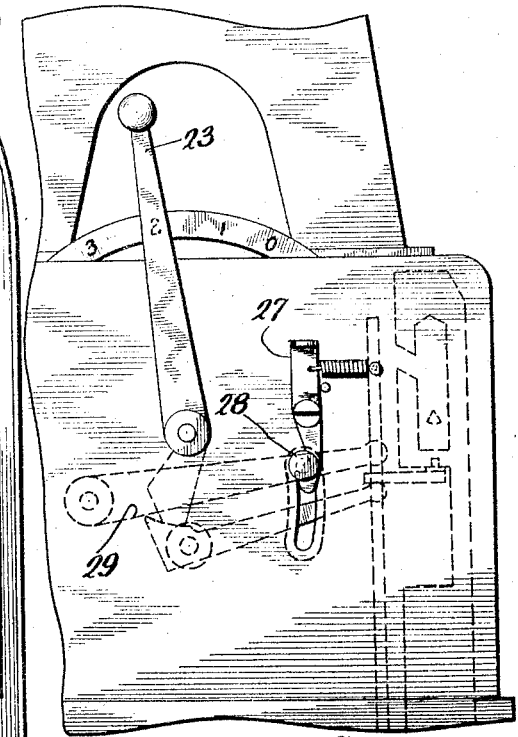

1,465,252

UNITED STATES PATENT OFFICE.

ROBERT CRAIG, OF DAYTON, OHIO, ASSIGNOR, BY MESNE ASSIGNMENTS, TO COMPUTING-TABULATING-RECORDING CO., OF NEW YORK, N. Y., A CORPORATION OF NEW YORK.

WEIGHING SCALE.

Application filed May 7, 1921. Serial No. 467,765.

*To all whom it may concern:*

Be it known that I, ROBERT CRAIG, a citizen of the United States of America, residing at Dayton, in the county of Montgomery and State of Ohio, have invented certain new and useful Improvements in Weighing Scales, of which the following is a full, clear, and exact description.

The present invention relates to improvements in weighing scales and more particularly to improvements in the weight indicating devices.

The objects of the present invention reside in the provision of means for improving the weight indicating devices to the end that more comprehensive readings of the weight may be secured.

Other objects of the invention reside in the provision of means for indicating the weight for certain load ranges by one scale of graduations and other ranges by another scale of graduation.

Other objects and advantages will be set forth in more detail in the accompanying drawing in which:—

Fig. 1 shows a front view of one embodiment of my invention.

Fig. 2 is a sectional view of the scale shown in Fig. 1 taken on line 2—2 of Fig. 1.

Fig. 3 is an enlarged detail view of the indicating chart and shutter.

Fig. 4 is another sectional view taken on line 4—4 of Fig. 1.

Fig. 5 is a detail showing the mechanism for shifting the super capacity weight.

Fig. 6 is a view of a different embodiment of the invention.

Fig. 7 is a detail view of the chart and color filter.

Figs. 8, 9, 10 and 11 are illustrative charts showing the uses to which the constructions may be employed when it is desired to secure various indications of weight.

The scale to which the present invention is shown as applied comprises certain parts which form the subject matter of a separate application, Serial Number 439,334. The present invention in its application is not generally limited to the particular scale disclosed but is directed to a novel arrangement of structure as will be more particularly defined by the appended claims.

In general the scale comprises a suitable housing 15 for the main parts of the mechanism and a chart housing 16 supported thereon.

Within the chart housing is fulcrumed a beam 17 having connected thereto the usual draft rod 18 and having also connected thereto any suitable automatic counterbalancing system such as the pendulum 19. A connection 20 is pivotally supported upon the beam and carries a rack 21 which drives the indicating drum 22 in the usual manner.

For loads beyond the normal range of the pendulum as shown by one revolution of the drum 22, the excess load may be offset by capacity weights. A lever 23 (Fig. 1) acting through cams 24 and finger arms 25 selectively applies to one or more of the three weights 26 (Fig. 2) to a knife edge carried by the scale beam. When still further load is to be offset, a dog 27 is disengaged from a handle 28 and the handle lowered thereby swinging down a supplementary finger arm 29 and depositing one additional weight 30 upon the beam. Weight 30 will hereafter be termed a super capacity weight. This weight 30 when applied returns the drum to its starting position and each of the weights 26 when applied returns additional weight 30 upon the beam. Weight the drum housing there is provided a shutter 31 having staggered window apertures therein. This shutter is interconnected to the capacity weight handle 23 by a link 32. The arrangement is such that the shutter selectively discloses to view different sections of the chart upon the drum. Upon swinging the handle 23 the shutter will be displaced so that one or the other of the apertures therein will align with the window opening in the drum housing and thereby selectively expose different portions of the chart to view. Referring to Figs. 9 and 1: if handle 23 is in zero or home position and none of the weights 26 are upon the beam, section A of the chart will be exposed. If one weight is applied B section will be employed, with two weights C section will be exposed, and with three weights the D section will be visible. The construction just described is more fully described in my copending application heretofore referred to.

When loads in excess of the amount which can be offset by the three capacity weights and the pendulums are to be weighed, the handle 23 is preferably first returned to home position and the super weight applied to the beam. This super weight offsets the weight corresponding to the combined forces of the three weights 26 and of the pendulum 19 when the latter has swung through its complete travel. In consequence the drum 22 is returned to starting position and the next weight reading may again be taken from section A.

The handle 23 may be again manipulated when the chart is turned through a complete revolution by the applied load to again selectively bring into view the sections B, C, D. Thus so far as offsetting the load is concerned the scale described readily takes care of loads eight times the amount of load handled by the pendulum system alone. The indication of all of the load for the first four steps is directly displayed by the different sections of the chart. Thereafter, however, there is a repetition of the display over the same sections of the chart and this necessitates a double set of graduations which if concurrently displayed would be confusing and objectionable if not entirely impossible to read.

To enable direct unconfused readings of the chart to be taken for both the first and second direct display of the same chart section I print the first section of the chart in red characters as shown in black lines marked $r$ in Fig. 9. The super section is printed in green characters which are shown in dotted lines marked $g$ in Fig. 9.

To selectively render visible either the red or the green characters and to obscure the characters which are not to be read, I provide a supplementary pivoted shutter 33 within the housing and connect this shutter by a suitable link 34 to the super weight mechanism. The shutter 33 is provided with two color filter sections colored red and green as shown at $35^g$ and $35^r$ and these filter sections are so arranged that the green filter will be in position when the super weight is off thereby obscuring the green characters $g$ and displaying the red characters in black. With the super weight "on" the red filter will be in position and the red characters $r$ will be obscured and the green characters shown in black to the operator.

It will be understood that suitable illuminating devices such as the electric lamps 36 may be employed, likewise the usual lenses 37 and reading wires 38. These features being well known in the art require no detailed description.

The embodiment of the invention shown in Fig. 6 and 7 illustrates a simpler embodiment of the invention. Here one capacity weight $30^a$ is employed. The chart comprises a single section A and the color filter shutter 33 is interconnected through a link 39 with the capacity weight changing lever 40. No apertured shutter is employed. For the first revolution the red section of the chart is read through the green filter and upon the second repeat revolution the green section is read through the red filter.

It will be understood that a wide variety of chart arrangements may be used to secure certain desired results. Figs. 8, 10 and 11 illustrate certain applications of the super weight embodiment of the invention and for simplicity in illustration these chart sections are shown only for the first two chart sections A and B. They could be extended as desired but it will be assumed that the scale has a drum with a two section chart, a shutter 31 with two window apertures and a suitable red and green color filter operated by the super weight device.

Fig. 8 shows a chart without any color graduations, total capacity 20#s with 10#s capacity per section and with the weight graduations 1/16" apart. Upon the application of a capacity weight the shutter changes the reading from column A to B. This is my previous construction and is here illustrated merely for convenience in explaining the improvements which follow.

Fig. 10 shows a chart of a scale having the same total capacity as before but with 0 to 5 # graduations for the first section A in red, 5 to 10 # graduations for the B section in red, 10 to 15 # on the A section in green and from 15 to 20 lbs. on the B section in green. Change from A to B sections is made by the capacity weight device and for the higher readings between 10 and 20 lbs. the super weight is employed. In this embodiment the individual graduation lines are spaced 1/16" apart as before shown in Fig 8 but each line represents a smaller division of weight. By using this chart the weight can be readily read to 1/32 of a pound without interpolating the chart. In the former construction shown in Fig. 9 the limit of direct reading is 1/16 of a pound. By this chart arrangement used in connection with my improved construction I am enabled to increase the number of graduations of a scale without increasing its capacity.

Fig. 11 in general is the same as Fig. 10 except that the ¼ oz. graduations are omitted and the resulting chart gives the same number of intermediate graduations between the pound marks as in Fig 8 but with double the clear interval between each line. In this way I may provide a scale in which the clear interval between divisions is increased without increasing or diminishing their number.

It will be understood that in all of the embodiments of charts illustrated the fractional pound values and graduation lines may be printed either in black ink or they may be printed with a double impression of superimposed and aligned red and green inks. With either method of printing the result will be the same when read through a filter namely a black image will be displayed.

What I claim is:

1. In a weighing scale, in combination, a scale beam, an indicator variably positioned thereby, said indicator having a plurality of sets of indicating characters, one set being in one color and the other in another color, a capacity weight device adapted to deposit a weight upon the scale beam, and a color filter device interacting therewith and adapted to change the visibility of the graduations from one set to the other upon the changing of the capacity weight.

2. The invention set forth in claim 1 in which the color filter device is adapted to render one set of the colored characters invisible and the other set visible in a different color than that in which the set is printed.

3. In a weighing scale, in which means is provided for changing the load offsetting capacity of the scale by the application of capacity weight to a moving part thereof, in combination, an indicator adapted to indicate the offset load, said indicator having a plurality of sets of weight indications, each set having a particular color, and means including devices operated concurrently with the changes in the capacity weight for changing the visibility of the sets of indications by varying the color characteristics of light rays.

4. In a weighing scale in which means is provided for changing the load offsetting capacity of the scale by the application of capacity weight to a moving part thereof, in combination, an indicator for the offset load, said indicator having a plurality of sets of indicators, one set being in one color and the other being in another color, a color filter device having colors similar to the colors of the indications, and means operating concurrently with the shifting of the capacity weight device for shifting the color filter device in front of said indicator and thereby rendering one set of graduations visible and the other set invisible.

5. In a weighing scale having an indicator provided with a plurality of weight indicating sections, each of said sections having a double set of characters, one being in one color and the other in another color, means independent of the movement of the indicator for selectively displaying a particular section of the indicator, and means for obscuring from view one of the sets of colored characters and for displaying the other set.

6. In a weighing scale having an indicator provided with a plurality of indicating sections, each section having a double set of characters one set being printed in one color and the other in another color, means independent of the movement of the indicator for selectively displaying a particular section of the indicator, and means for rendering one of the colored sets of characters invisible and the other colored set visible in a different color from that in which said set is printed.

7. In a weighing scale having in combination, a drum indicator provided with a plurality of indicating sections, a capacity weight changing device, a shutter operated thereby for obscuring certain sections and displaying a particular section, each said indicating section being provided with a double set of characters in different colors, a super-capacity weight and means for applying the same, and means operated concurrently with the aforesaid means for changing the visibility of the colored characters from one to the other set.

8. In a weighing scale having in combination, a scale beam, an indicator, a capacity weight changing device for applying one or more capacity weights to said beam, a super capacity weight changing device for applying a super capacity weight to said beam, and display changing devices operated conjointly by both the said weight changing devices for controlling the visibility of the indications.

9. In a weighing scale having, in combination, a scale beam, an indicator, having different indicating sections and a double group of characters in each section, a capacity weight changing device for applying one or more capacity weights to the beam, a super capacity weight changing device for applying a super capacity weight to said beam, and displaying changing devices operated conjointly by both said weight changing devices for controlling both the visibility of the sections and of the groups of characters in a single section.

10. In a weighing scale, in combination, a scale beam, a multi-section indicator therefor, each section of said indicator having a double set of characters, means for applying one or more capacity weights to said beam and for concurrently selectively displaying a corresponding section of the indicator, and means for applying an additional capacity weight to said beam and for concurrently selectively controlling the visibility of one or the other set of characters of said section.

11. The invention set forth in claim 10 in which an apertured shutter is provided for changing the display of the indication from section to section and in which a color filter is provided for controlling the visibility of the sets of characters.

12. In a weighing scale having capacity weight devices, an indicator having a plurality of graduated indicating sections for different load ranges, a capacity weight device for offsetting certain portions of the applied load, means controlled by said device for changing the display of the indication from section to section as the load range correspondingly changes, and means for changing the entire display of indications by a supplemental means when a predetermined load is exceeded.

13. In a weighing scale, in combination, a scale beam, an automatic counterbalance therefor, a capacity weight device, and an indicator, said indicator having dual sets of weight indications in different colors, and means operated by said capacity weight device for changing the display of the indication by means of changeable color screens disposed in front thereof.

In testimony whereof I hereto affix my signature.

ROBERT CRAIG.

Certificate of Correction.

It is hereby certified that in Letters Patent No. 1,465,252, granted August 21, 1923, upon the application of Robert Craig, of Dayton, Ohio, for an improvement in "Weighing Scales," an error appears in the printed specification requiring correction as follows: Page 1, strike out present line 83 and insert instead *the drum through one revolution. Within;* and that the said Letters Patent should be read with this correction therein that the same may conform to the record of the case in the Patent Office.

Signed and sealed this 9th day of October, A. D., 1923.

[SEAL.]
WM. A. KINNAN,
*Acting Commissioner of Patents.*